(12) United States Patent
Knowles

(10) Patent No.: US 8,919,193 B2
(45) Date of Patent: Dec. 30, 2014

(54) ULTRASONIC LIQUID LEVEL DETECTOR

(75) Inventor: Terence J. Knowles, Lake Barrington, IL (US)

(73) Assignee: Street Smart Sensors LLC, Austin, TX (US)

( * ) Notice: Subject to any disclaimer, the term of this patent is extended or adjusted under 35 U.S.C. 154(b) by 216 days.

(21) Appl. No.: 13/599,291

(22) Filed: Aug. 30, 2012

(65) Prior Publication Data

US 2013/0047719 A1 Feb. 28, 2013

Related U.S. Application Data

(60) Provisional application No. 61/529,043, filed on Aug. 30, 2011.

(51) Int. Cl.
*G01F 23/284* (2006.01)
*G01F 23/296* (2006.01)

(52) U.S. Cl.
CPC ........ *G01F 23/2961* (2013.01); *G01F 23/2962* (2013.01)
USPC ...................................................... 73/290 V

(58) Field of Classification Search
USPC ............................... 73/290 V, 597
See application file for complete search history.

(56) References Cited

U.S. PATENT DOCUMENTS

| | | | |
|---|---|---|---|
| 3,113,456 A | 12/1963 | Smith et al. | |
| 4,193,291 A | 3/1980 | Lynnworth | |
| 4,545,245 A | 10/1985 | Sharp | |
| 5,042,298 A | 8/1991 | Grein et al. | |
| 7,239,129 B2 * | 7/2007 | Steinich ...................... | 73/290 V |
| 2003/0024306 A1 * | 2/2003 | Benz ........................... | 73/290 V |
| 2003/0164049 A1 | 9/2003 | Oddie et al. | |
| 2009/0183564 A1 | 7/2009 | Kotz et al. | |
| 2010/0024535 A1 | 2/2010 | Maeda | |
| 2012/0239316 A1 * | 9/2012 | Foote ............................. | 702/55 |
| 2013/0000400 A1 * | 1/2013 | Welle et al. ................. | 73/290 V |
| 2014/0083183 A1 * | 3/2014 | Edvardsson ............... | 73/290 V |
| 2014/0208845 A1 * | 7/2014 | Zlotnick et al. ............. | 73/290 V |

FOREIGN PATENT DOCUMENTS

WO 2008089209 A2 7/2008

OTHER PUBLICATIONS

International Search Report for PCT/US2012/053084 dated Nov. 16, 2012.

* cited by examiner

*Primary Examiner* — G. Bradley Bennett
(74) *Attorney, Agent, or Firm* — Levenfeld Pearlstein, LLC

(57) ABSTRACT

An ultrasonic sensor detects the presence or absence of a fluid in contact with the sensor and a level of fluid along the sensor. The sensor includes a first probe having a. transducer element operably connected thereto. The transducer element is configured to transmit an ultrasonic signal through the first probe, A second probe has an other than straight shape. The second probe has a transducer element operably connected thereto that is configured to receive the ultrasonic signal transmitted by the first probe to determine the presence or absence of a fluid and when present, the location of fluid along the second probe. The other than straight shape of the second probe increases the path length of the received signal to increase the resolution and accuracy of sensing the presence or absence of the fluid, and when present, the resolution and accuracy of a location along the second probe at which the fluid is present.

23 Claims, 5 Drawing Sheets

Fig. 4
Fig. 4A
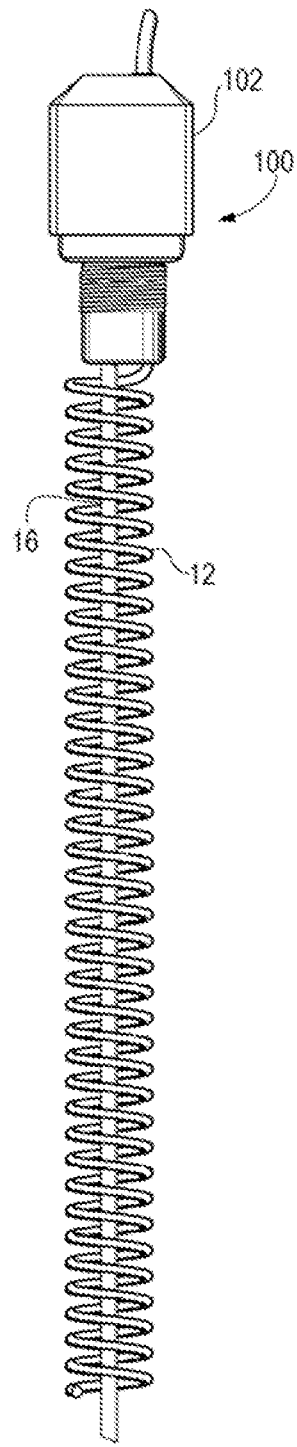
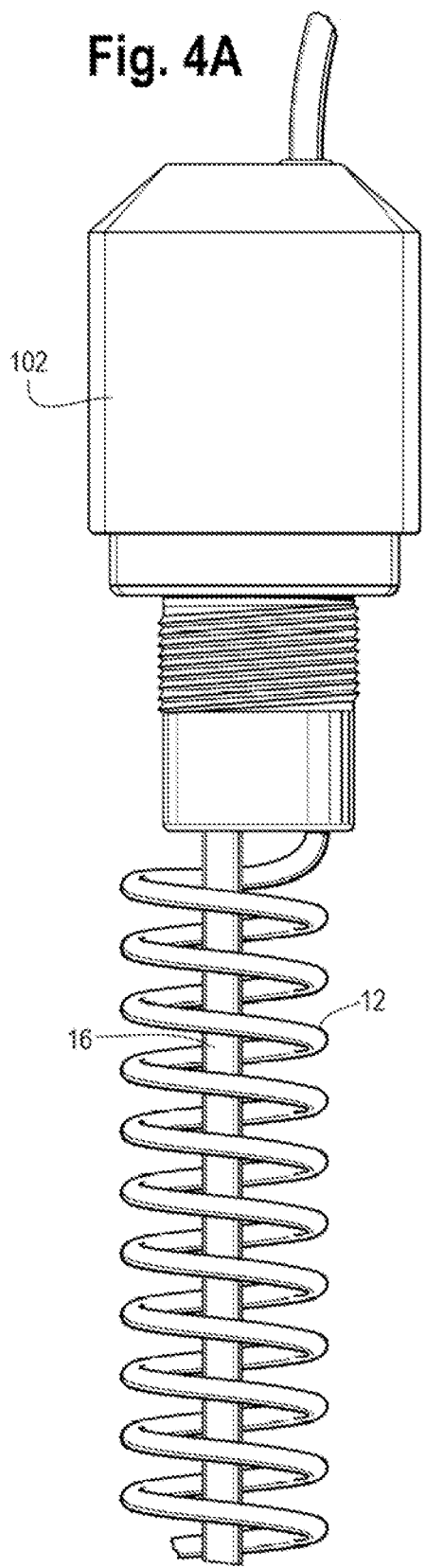

ULTRASONIC LIQUID LEVEL DETECTOR

BACKGROUND

Level sensors are known in the art. Various types of mechanical, electro-mechanical and electrical sensors are known. The type of sensor used for any given application will depend upon the application.

Fluid level can be determined using, for example, one type of electromechanical sensor is a float type sensor commonly found in most automobiles. Such a sensor consists of an arm whose height is fixed at one end, such as at a pivot, with the other attached to a float that is in positioned in part within the fluid. The arm can pivot in a vertical plane. Changes in fluid level results in changes of the angle of the arm with respect to the vertical. The change is sensed with a potentiometer and is thus converted to an indication of fluid level.

Another type of electromechanical sensor includes a magnet attached to a float that is constrained to move on a vertical rod. The rod is both magnetostrictive and capable of supporting ultrasonic waves. The magnet changes the acoustic properties of the rod, causing an ultrasonic pulse initiated at one end to he reflected at the magnet position. The time that elapses for a group of waves to traverse the rod from the initiating end to the magnet and back to the initiating end is a measure of the fluid level.

While these systems are widely used, they have several known drawbacks. First, the float can stick in a fixed position due to aging, debris or the like. Moreover, it has been found that the assembly can degrade over time because it has moving (mechanical) parts that may tend to wear. It has also been observed that in certain systems, turbulence and fast flowing liquids can damage the mechanisms. And, typically, the operating temperature range is restricted.

Among the sensors with no moving parts, there are two that propagate waves through the fluid vapor and reflect at the fluid/vapor boundary, with time of flight as the proxy for fluid level. One system uses electromagnetic waves in the microwave region, and the other uses ultrasonic waves. These systems can have issues with turbulence, liquid sloshing and variation in flight, times due to changes in vapor pressure and temperature.

A variation on this is to couple a transducer to the bottom of a tank and send an acoustic pulse through the liquid to reflect off the air/fluid interface and return to the transducer. This system has drawbacks similar to that as over the air, time of flight sensors, and is also very sensitive to aeration.

A further acoustic type includes two parallel rods. An acoustic pulse in the form of extensional waves is sent down one rod, and in the presence of a the extensional mode converts to a compressional mode which propagates across the fluid, and is received and converted back to an extensional mode by the second rod. The time interval from the start of the pulse in the first rod, across the fluid, to a receive transducer in the second rod is used to determine level. Problems have been observed with this type of sensor in that due to the large differences in acoustic impedance between practical rod materials and typical fluids, the received signals are very small and require substantial signal processing.

Other sensors, such as those disclosed in Knowles, U.S. Publication 201010024535, and WO 2008/089209, both of which are incorporated herein by reference, use an elongated probe with a transducer operably connected thereto. The transducer is configured to produce extensional waves in the probe and circuitry for detecting acoustic energy that is emitted into the liquid when liquid is in contact with the probe. These probes, too, while functioning well in certain applications such as discrete water level detection, have been observed to have limited use in fluids that may be aerated.

Accordingly, there is a need for a level sensor with enhanced depth resolution. Desirably, such a sensor permits determining the density of the fluid and the viscosity of the fluid. Desirably, such a combination of this measurements allows for the characterization of a fluid and the fluid level in a single sensor.

BRIEF SUMMARY

An ultrasonic sensor detects the presence or absence of a fluid in contact with the sensor. The sensor includes a first probe having a transducer element operably connected thereto. The transducer element is configured to transmit an ultrasonic signal through the first probe.

A second probe has a helical shape and has a transducer element operably connected thereto that is configured to receive ultrasonic signals transmitted by the first probe to the second probe in the presence of a fluid.

The helical shape of the second probe increases the signal path length and the signal strength, and this increases the resolution and accuracy of sensing the presence and level of the fluid.

In an embodiment, the first probe is a straight rod. The straight rod can have a circular cross-section. The helical probe has an effective length or acoustic length that is longer than the first probe. The first probe transducer is a compression-type transducer operate in radial mode.

Alternately, the first probe can have a prismatic shape. In such an embodiment, the sensor can be used to detect the density of the fluid from which the viscosity can then be determined.

The first probe can be positioned within the helix that is defined by the helical second probe. Alternately, the first and second probes can be disposed in a side-by-side and generally parallel relation to one another.

In an alternate embodiment, the first probe can have as helical shape. Preferably, the first and second probes are supported by a housing.

A method of detecting the presence or absence of a fluid and the level of the fluid in contact with the sensor, includes providing as first probe having a transducer element operably connected thereto that is configured to transmit an ultrasonic signal through the first probe and providing a second probe having as helical shape, having a transducer element operably connected thereto. The second probe transducer element is configured to receive the ultrasonic signal transmitted via the first probe, through the fluid, to the second probe to determine the presence of the fluid and the level of the fluid.

The helical shape of the second probe increases the path length of the received signal to increase the resolution and accuracy of the presence and location along the second probe at which fluid is present to determine fluid level.

The method can include positioning the first probe within as helix defined by the second probe. In such a method, the helical probe has an effective length that is at least as long, and preferably longer then the first probe.

The first probe can be provided having a prismatic shape. In such a method, one or more of a density of a viscosity of, and a speed of sound in, the sensed liquid can also be determined.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein:

FIGS. 4 and 4A are photographic illustrations of one embodiment of the sensor having a housing with the rods depending from the housing in a cantilever arrangement, with FIG. 4A being an enlarged view of the housing.

DETAILED DESCRIPTION

Figure 1:
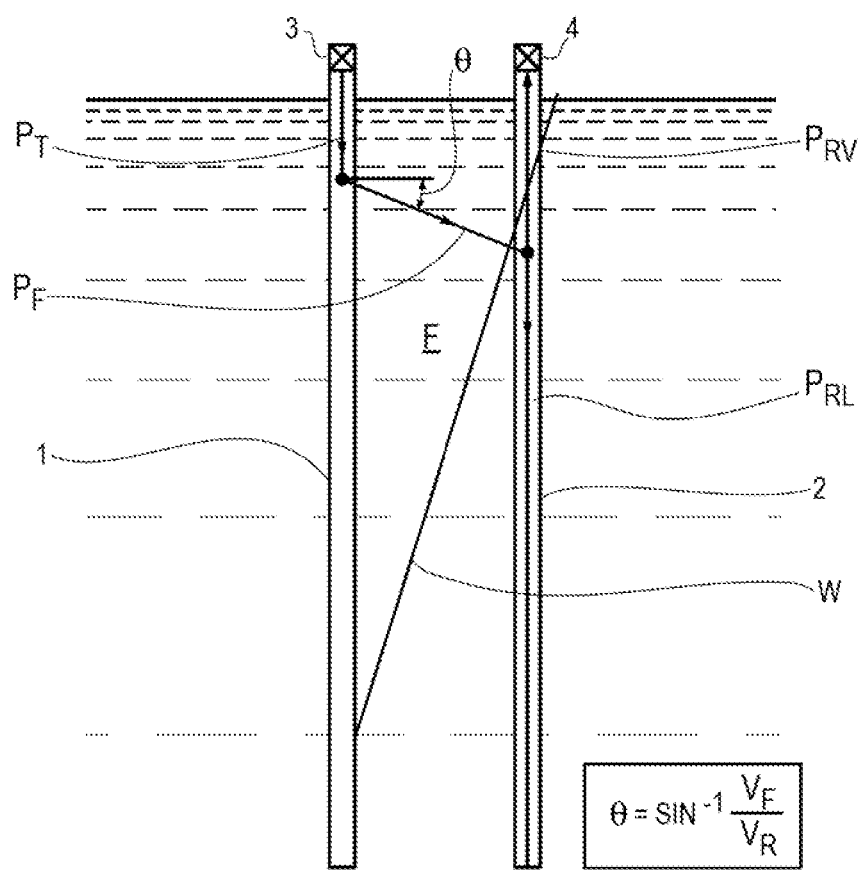
FIG. 1 illustrates a prior art level sensing device or level sensor in which parallel rods (transmit and receive rods) are used.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

FIG. 1 illustrates a prior known sensor having a pair of parallel rods 1,2. In such a sensor, a group of extensional waves propagate down a transmitting rod 1, traverse the fluid F as compressional waves W, and intersect the receiving and 2. This type is known in the prior art, (see, e.g., Lynnworth, U.S. Pat. No. 4,193,291; Lynnworth, *Liquid Level Measurements Using Longitudinal, Shear, Extensional and Torsional Waves,* Ultrasonics Symposium (1979); and Lynnworth, *Slow Torsional Wave Sensors,* Ultrasonics Symposium Proceedings (1977)).

In such a known parallel rod acoustic sensor, which is defined here as a transmission type, ultrasonic waves are transmitted from a transducer 3, along the rod 1, through a fluid F across a gap and are received by the other rod 2 at its transducer 4. This type of arrangement works in non-aerated fluids as a discrete level sensor but is problematic for continuous level sensing because of low signal level and poor resolution.

Figure 2:
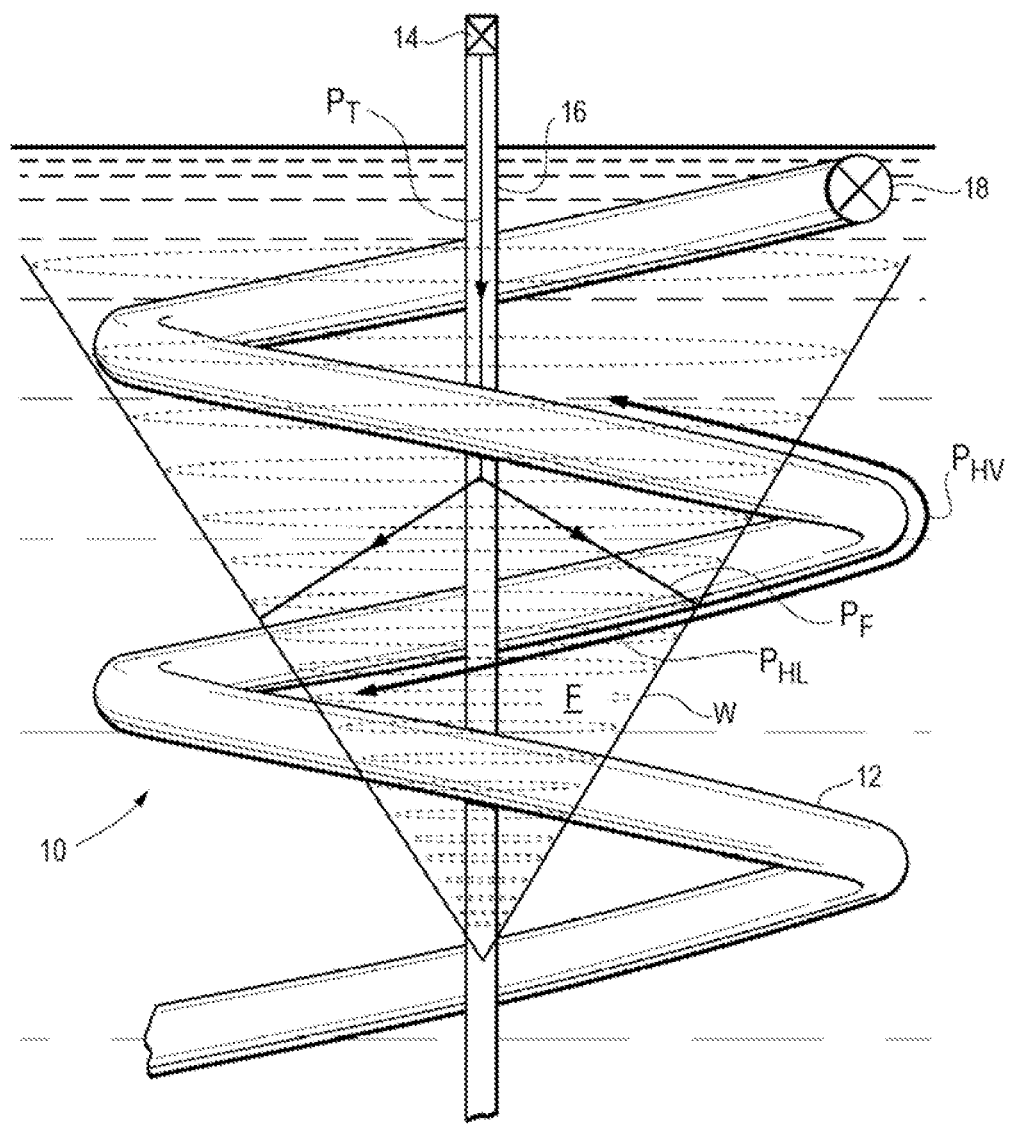
FIG. 2 illustrates an embodiment of a helical rod sensor.

Illustrated in FIG. 2, is a sensor 10 that illustrates the use of a receive rod 12 with a greater effective length than a transmit rod 16. In the illustrated embodiment, the greater effective length is achieved by the use of a receive rod 12 have an other than straight shape, such as the illustrated helical shape. In such an arrangement, extensional waves are generated by a transducer 14 on the transmit rod 16. The waves W traverse the fluid F as compressional waves and intersect the helical receive rod. Extensional modes are created that travel up and down the rod, away from the intersection of the wave front and the rod and are sensed at the transducer 18. The path length of the upward travelling waves varies with immersion. depth (e.g., liquid level). As such, transit time, which is linearly related to path length is also linearly related to level.

Figure 3:
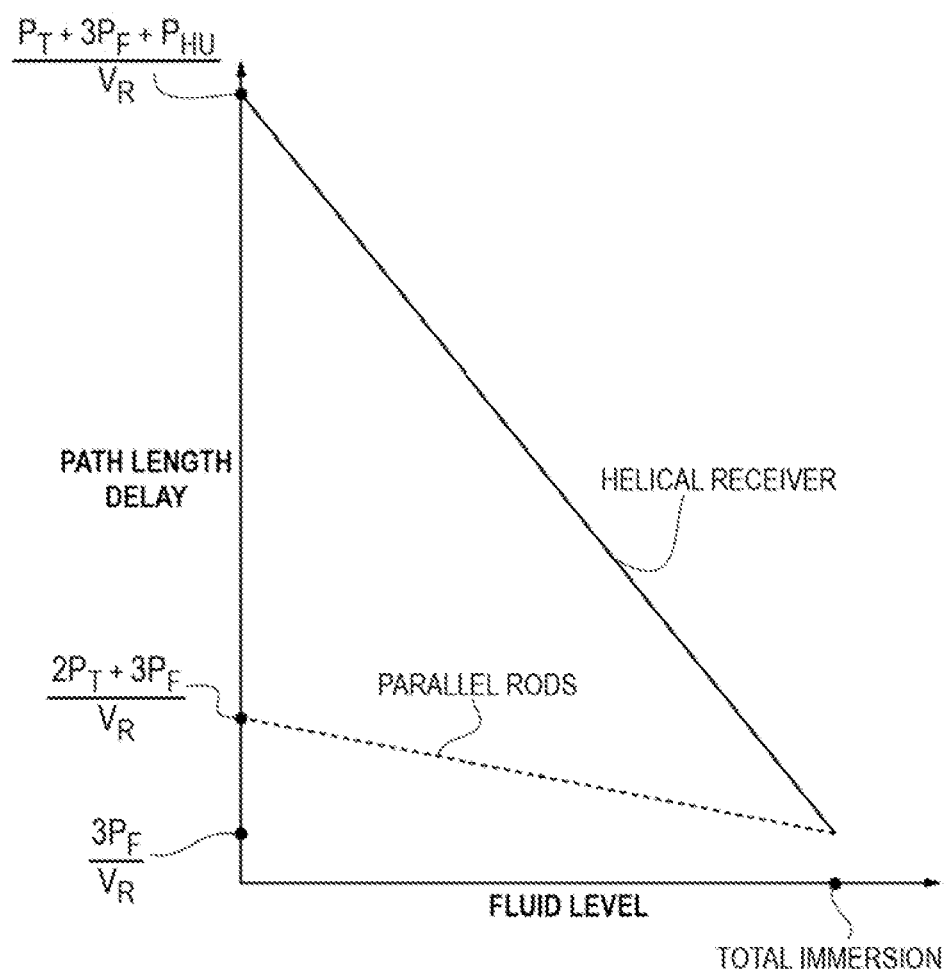
FIG. 3 is a graphical representation of the time delay versus fluid level using a parallel rod (transmit and receive) sensor and a sensor having a helical receive rod.

What has been found, however, as seen in FIG. 3, is that the amplitude of the waves going up is considerably greater for a helical rod compared to two parallel rods. Accordingly, such a helical arrangement, with a central rod, allows for a simpler signal processing system that is much less susceptible to electronic noise.

The helical arrangement also exhibits another significant advantage. The ability to resolve changes in fluid level depends on resolving changes in the transit time from transmit transducer to the receiver. A typical speed for extensional waves in stainless steel and aluminum is approximately 5 millimeters per microsecond. A change of 1 mm in a fluid will cause a change in transit path of 2 mm or ⅖ of a microsecond in transit time. Such a small time period is difficult to resolve with low cost micro-controllers, and frequencies in the sub MHz range. In contrast a helical rod receiver of, for example, 5 turns per inch and a helix diameter of 1.5 cm provides a considerably longer path length traversed by the extensional wave. Due to the extra path length traversed (over a straight rod transmitter), the change in transit time can readily be more than 5 times that of the parallel rod system, or a minimum of 2 microsecond per mm.

It will be appreciated by those skilled in the art that although the overall length of the helical and straight rod may be equal (that is, the length from top to bottom of the rods), the effective length or acoustical path length of the helical rod (that is, measuring the length of the rod as if it were straightened out), is considerably greater than the straight rod.

The helix thus has at least two beneficial effects: it increases signal amplitude; and it increases level resolution for fixed time resolution. Note that the waves used for sensing, travel in the parts of the rods that are not immersed in fluid, so there are very small damping effects, and the waves can travel significant distances, allowing for helical rods to he several meters in length.

The pitch and diameter of the helix can also be tailored to the specific application. For example, a resolution of 1 mm or less requires a finer pitch and or increased diameter, whereas tank depths of 2 meters (M) generally do not require as fine a resolution. Accordingly, for such deeper tanks, the number of turns per unit length can be reduced.

The pitch of the helix is limited at the upper end by how much time is allowed to drain the helix. Fluid trapped between turns can create acoustic paths Which tend to acoustically "short" the turns. It is anticipated that highly viscous fluids will require greater distances between turns to reduce the effects of bridging. Similar considerations should apply to the gap between the center rod and outer helix.

Defining G as the ratio of acoustic path length to the length of the helix, the change in transit time per unit change in level increases compared to the parallel straight rod sensor by a factor of (G+1)/2. G can readily be 10 for practical designs, thus, substituting a helix for a straight rod can increase level resolution by a factor of 5 or more.

Without being bound by theory, it is believed that the sensor provides greater resolution and sensitivity due to the increased path length of the receive rod 12. When a signal is transmitted through the transmit, rod 16, that signal is converted to a compression wave in the fluid that is received by the receive rod 12, and converted to extensional modes in the receive rod 12 at the fluid interface (where the rod 12 penetrates the fluid). A portion of the signal travels along the rod 12 directly to transducer (in the illustrated rod, that portion of the signal travels directly upward). Another portion of the signal travels down the rod 12 to the end of the rod and then reflects back up the rod to the receive rod transducer. The characteristics of these two signals are different from one another and the transducer detects the difference in the signals as well as the time difference for receiving the signals. In that the helical receive rod provides a considerably longer path for the signal to travel, it is easier to determine the level (fluid interface) at which the probe penetrates the fluid.

Moreover, it has been found that an inner rod of prismatic shape, for example, a rectangular blade, in conjunction with a helical outer rod converts compressional fluid waves to torsional waves. Lynnworth, noted above teaches that a prismatic shaped rod with torsional excitation, has a round trip delay time proportional to immersed length and fluid density. With a helix/prismatic rod system level can be determined, and the delay can he measured in the prismatic rod to determine fluid (liquid) density. As such, with a helix/prismatic rod combination, both the level and density can he determined. Knowing density, immersed length and viscous losses in the helix, the viscosity can be calculated, and knowing the gap distance from transmitter to receiver allows for a determination of the compressional speed in the fluid.

Thus by knowing (for example, by measuring with a thermistor) the fluid temperature, the density, viscosity and speed of sound in the fluid as well as level can be determined.

The rods, both straight and helical, can be formed from a variety of materials, such as metal, ceramic, plastic and the like, appropriate for the application in which they are used, so long, as the rods are capable of supporting extensional and torsional waves.

As will be appreciated by those skilled in the art, the application of helical rods has a number of advantages over straight rod, receiver/transmitter pairs, such as greatly increased return path amplitudes and greatly increased resolution. When a prismatic rod is substituted for a center circular rod, the sensor can be used to determine density as well as level, enabling viscosity to be calculated from viscous losses in the helix. In addition, as is the case with the straight rod system, the speed of sound in the fluid can also be determined.

Figure 5:
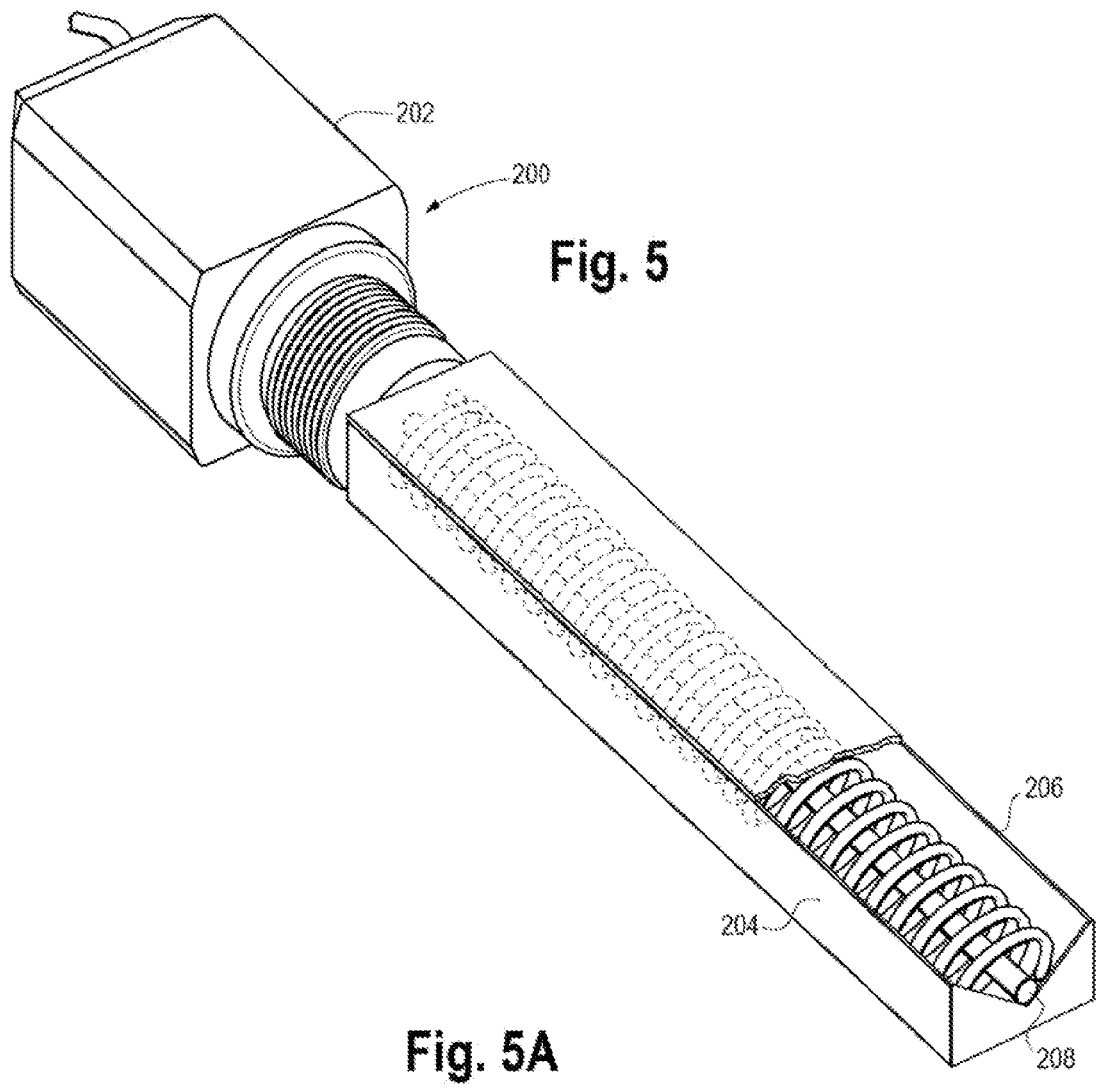
FIGS. 5 and 5A illustrated an alternate embodiment in which a support extends from the sensor housing, with FIG. 5A being an enlarged view of the end thereof.
Figure 5A:
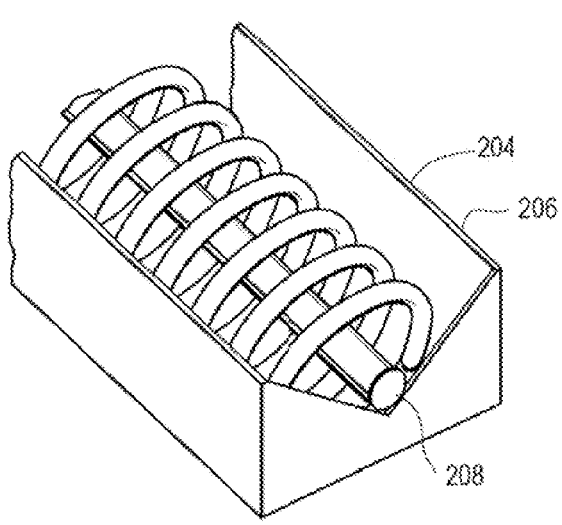

Although the present sensor is disclosed and discussed as configured with a helical rod and a centrally disposed, coaxial circular or prismatic rod, it is contemplated that other configurations can also be used in the present novel sensor assembly. For example, two helixes either parallel or co-axial, a helix with one circular parallel to the helix, a prismatic rod and one circular in parallel and two prismatic rods in parallel FIGS. 4-4A and 5-5A illustrate support systems 100, 200 for the sensor. As seen in FIG. 4-4A, a housing, 102 supports the helical 12 and straight 16 rods, so that the rods remain in a fixed orientation relative to one another with the rods spaced apart. In the illustrated embodiment both rods depend from the housing in a cantilevered arrangement. Alternatively, as seen in FIGS. 5-5A, a support 204 member depends from housing 202, formed integral with or attached thereto, to provide support as well as protection for the rods. A free end 206 of the support member can include a centering element 208 to maintain the central (straight) rod centered or aligned relative to the helical rod. Other arrangements will be recognized by those skilled in the art.

All patents referred to herein, are incorporated herein by reference, whether or not specifically done so within the text of this disclosure, in the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An ultrasonic sensor for detecting the presence or absence of a fluid in contact with the sensor, and/or its level, comprising:

a first probe having a transducer element operably connected thereto, the transducer element configured to transmit an ultrasonic signal through the first probe; and a second probe having other than a straight shape, the second probe having a transducer element operably connected thereto, the transducer element configured to receive the ultrasonic signal transmitted by the first probe through the fluid, to determine the presence or absence of a fluid, and when fluid is present, a location of the fluid along the second probe, wherein the other than straight shape of the second probe increases the path length of the received signal to increase resolution and accuracy of sensing the presence or absence of the fluid, and when fluid is present, the resolution and accuracy of the location along the second probe at which the fluid is present.

2. The ultrasonic sensor of claim 1, wherein the first probe is a straight rod.

3. The ultrasonic sensor of claim 2, wherein the rod has a circular cross-section.

4. The ultrasonic sensor of claim 1, wherein the other than straight shape probe has an effective length that is at least as long as the first probe.

5. The ultrasonic sensor of claim 1, wherein the first probe has a prismatic shape.

6. The ultrasonic sensor of claim 1 wherein the other than straight shape is a helical shape.

7. The ultrasonic sensor of claim 5 wherein, when in the presence of a fluid, the sensor detects the density of the fluid.

8. The ultrasonic sensor of claim 6 wherein the sensor is further configured to determine the viscosity of the fluid.

9. The ultrasonic sensor of claim 1 wherein the first probe transducer is a compression-type transducer.

10. The ultrasonic sensor of claim 1 wherein the first probe transducer is a radial mode transducer.

11. The ultrasonic sensor of claim 6 wherein the first probe is positioned within a helix defined by the helical second probe.

12. The ultrasonic sensor of claim 6 wherein the first probe has a helical shape.

13. The ultrasonic sensor of claim 12 wherein the first probe is positioned with a helix defined by the helical second probe.

14. The ultrasonic sensor of claim 12 wherein the first and second probes are side-by-side and generally parallel relation to one another.

15. The ultrasonic sensor of claim I wherein the first and second probes are supported by a housing.

16. The ultrasonic sensor of claim 1 wherein one or both of the probes are formed from metal ceramic, plastic or a combination thereof.

17. A method of detecting the presence or absence of a fluid in contact with a sensor, and when fluid is present, a level of the fluid along the sensor, comprising the steps of:

providing a first probe having a transducer element operably connected thereto, the transducer element configured to transmit an ultrasonic signal through the first probe; and providing a second probe having an other than straight shape, the second probe having a transducer element operably connected thereto, the transducer element configured to receive the ultrasonic signal transmitted by the first probe to determine the presence of a fluid, and, when present, the location of fluid along the second probe, wherein the other than straight shape of the second probe increases the path length of the received signal from the first probe to increase resolution and accuracy of the presence of the fluid and a location along the second probe at which fluid is present.

18. The method of claim 17 wherein the other than straight shape is a helical shape.

19. The method of claim 18 including the step of positioning the first probe within a helix defined by the second probe.

20. The method of claim 17 wherein the other than straight shaped probe has an effective length that is at least as long as the first probe.

21. The method of claim 17 wherein the first probe has a prismatic shape.

22. The method of claim 21 including the step of determining one or more of a density of a viscosity of, and a speed of sound in, the sensed fluid.

23. The method of claim 17 wherein one or both of the probes are formed from metal, ceramic, plastic or a combination thereof.

* * * * *

UNITED STATES PATENT AND TRADEMARK OFFICE
CERTIFICATE OF CORRECTION

Page 1 of 2

PATENT NO. : 8,919,193 B2
APPLICATION NO. : 13/599291
DATED : December 30, 2014
INVENTOR(S) : Terence J. Knowles It is certified that error appears in the above-identified patent and that said Letters Patent is hereby corrected as shown below:

Title Page, (57), under Abstract line 3, "a." to read as --a--.

Title Page, (57), under Abstract line 5, "probe," to read as --probe.--.

In the Specification

Column 1, line 23, "he" to read as --be--.

Column 1, line 41, "flight," to read as --flight--.

Column 1, line 50, "the" to read as --fluid, the--.

Column 1, line 61, "20100024535," to read as --2010/0024535,--.

Column 2, line 36, "as" to read as --a--.

Column 2, line 41, "as" to read as --a--.

Column 2, line 44, "as" to read as --a--.

Column 2, line 54, "as" to read as --a--.

Column 2, line 58, "of" to read as --of,--.

Column 3, line 32, "4.193.291" to read as --4,193,291--.

Column 3, line 56, "immersion." to read as --immersion--.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,919,193 B2

Column 4, line 35, "Which" to read as --which--.

Column 5, line 4, "he" to read as --be--.

Column 5, line 6, "he" to read as --be--.

Column 5, line 16, "long," to read as --long--.

Column 5, line 35, "parallel" to read as --parallel.--.

Column 5, line 37, "housing," to read as --housing--.

Column 5, line 51, "disclosure, in" to read as --disclosure. In--.

In the Claims

Column 6, line 47, Claim 15, "claim I" to read as --claim 1--.

Column 7, line 14, Claim 22, "of" to read as --of,--.